Nov. 3, 1931.  M. H. ROBERTS  1,830,211
POWER REVERSE GEAR
Original Filed Feb. 26, 1921
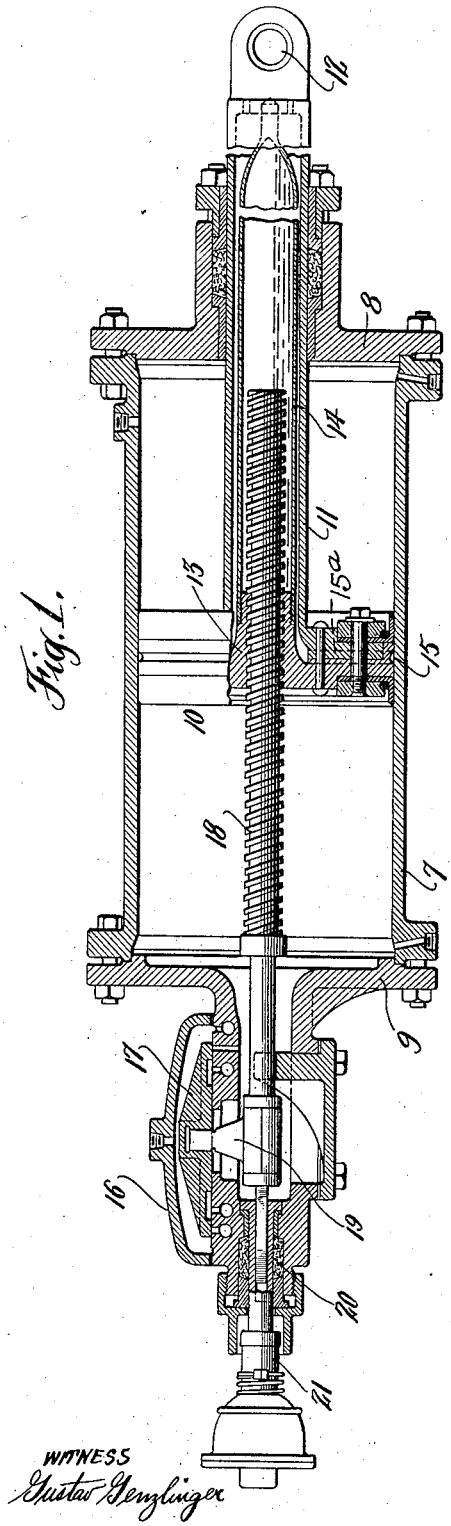
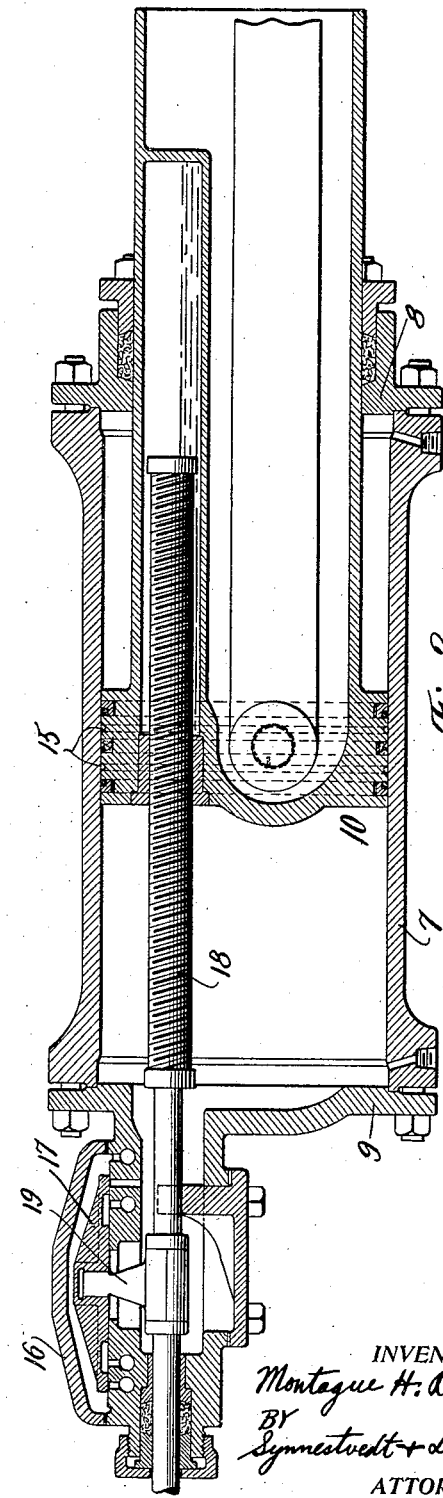
INVENTOR
Montague H. Roberts
BY
Synnestvedt + Lechner
ATTORNEYS Patented Nov. 3, 1931

1,830,211

UNITED STATES PATENT OFFICE

MONTAGUE H. ROBERTS, OF ENGLEWOOD, NEW JERSEY, ASSIGNOR TO FRANKLIN RAILWAY SUPPLY COMPANY, OF NEW YORK, N. Y., A CORPORATION OF DELAWARE

POWER REVERSE GEAR

Original application filed February 26, 1921, Serial No. 448,044. Divided and this application filed February 5, 1924. Serial No. 690,684.

This invention relates to power reverse gears such as are used, for example, on locomotives, and it is a division of my copending application Serial No. 448,044, filed February 26th, 1921, and since issued as Patent No. 1,500,685, on July 8, 1924.

Briefly, the invention has to do with a power reverse gear of the servo-motor type, having a direct connection between the valve and the piston by virtue of which combination levers and other mechanism involving lost motion may be dispensed with, and a gear obtained which is precise in its operation, with the piston and, therefore, the valve motion automatically maintained in any desired position of a cut off. The operating connection between the valve and the piston is such that the connection may be readily adjusted manually when it is desired to shift the piston to adjust cut off but, during automatic operation, the valve and piston move together. The operating connection comprises a screw threaded shaft, in the preferred embodiment of my invention.

My invention contemplates a simple, compact and effective arrangement and association or organization of parts in a gear of this type. The foregoing together with such other objects as may hereinafter appear, or are incident to my invention, I accomplish by means of a construction, the preferred embodiments of which are illustrated in the accompanying drawings, wherein Fig. 1 is a longitudinal section through one form of reverse gear embodying my improvements; and Fig. 2 is a similar section through another form of the invention.

Referring now to Fig. 1, the reference numeral 7 designates the power reverse gear cylinder which is attached to the locomotive boiler at a point intermediate the cab and the valve motion. This cylinder has two heads 8 and 9 and the piston 10, the piston rod 11 of which is made hollow. The piston rod extends through the head 9 and is suitably packed and is provided at its free end with the eye 12 for connection with the reach rod (not shown) leading to the link motion. The piston is made in two halves suitably secured together, one half having the hollow piston 11 preferably formed integrally therewith, and the other half having a hub 13. The hub 13 is provided with a central aperture which is threaded and the hub is also externally threaded to receive the tubular member 14, which lies within but is spaced away from the walls of the hollow piston rods. The forward end of the tubular member 14 is supported from the piston rod as shown.

The piston is provided with a pair of spaced packing rings—preferably cup leathers—as shown, and between the packing there is a groove 15 extending annularly of the piston, such groove being connected to the interior of the piston and thence to the atmosphere by means of a port 15a. Leakage thus occurs to the atmosphere instead of the low pressure side of the piston.

The head 9 is so shaped and constructed that it cooperates with the cap 16 to act as a valve chest in which the slide valve 17 is mounted. The arrangement of the ports and the piping will not be described for the reason that no specific claims thereto are made herein, and it will suffice for the purposes of this specification to point out that when the valve moves from the neutral position shown, one way or the other, pressure is introduced into the cylinder on one face of the piston and exhausted from the other.

The operating connection between the valve and the piston comprises the screw threaded shaft 18 and the tongue 19 which is carried on the shaft and engages the slide valve 17. The forward end of the shaft 18 is threaded into the hub 13 and is free to work within the tubular member 14 which is packed with grease or filled with some other lubricant. The rear end of the shaft 18 is squared to fit the squared recess in the sleeve 20, such sleeve extending out through the head and being suitably packed. Extending rearwardly from the sleeve 20 to the cab is the rotary hand operating means 21, a portion only of which is shown.

The operation is as follows: To shift the piston to adjust cut-off, the hand operating means 21 is rotated which in turn rotates the shaft 18, causing it to lengthen or shorten with respect to the piston, as the case may be, correspondingly moving the valve and opening the appropriate ports to admit pressure to and exhaust pressure from opposite faces of the piston. As long as the shaft is being rotated, the valve will be held in open position, and as soon as rotation of the shaft ceases, movement of the piston will cause the valve to move to closed position, bringing the piston to rest. In case the piston should move under shock or thrust or by virtue of a drop in pressure on one face or the other, the valve will immediately move with it, opening the appropriate ports to allow an exhaust pressure to bring the piston back to the pre-selected position.

The advantages of the arrangement are that practically no working parts are exposed, the valve chest is in line with the cylinder and the shaft in line with the piston rod, making the device compact and simple in construction. The pull on all parts is direct, the screw is easily lubricated, and dirt is excluded from the lubricant.

The construction of Fig. 2 is, in all essentials, the same as that already described. In this arrangement the operating connection is adapted to a piston formed integrally with the piston rod, the parts being in a single piece instead of being split. The piston in this case, is of the trunk type, in the trunk of which the reach rod extends for connection. With such an arrangement, the screw shaft should be located to one side, as shown, and this necessitates a similar disposition of the valve and valve chest.

I claim:

1. In a locomotive servo-motor power reverse gear, a cylinder, a piston having a central hollow rod, a valve, and an operating rod constituting a direct operating connection between the valve and the piston and extending into the hollow piston rod.

2. In a locomotive servo-motor power reverse gear, a piston having a central threaded aperture, a valve and a shaft having a direct connection with the valve and threads engaging said piston aperture.

3. In a locomotive servo-motor power reverse gear, a threaded piston, a valve and a shaft having a direct connection with the valve and threads engaging the piston, said piston having a central hollow rod into which an end of the shaft is adapted to extend.

4. In a locomotive servo-motor power reverse gear, a threaded piston, a valve and a shaft having a direct connection with the valve and threads engaging the piston, said piston having a hollow rod into which an end of the shaft is adapted to extend, together with a tubular housing within the rod adapted to receive the end of the shaft threaded into the piston.

5. In a locomotive servo-motor power reverse gear, a piston head having a threaded aperture, a valve and a shaft having a direct connection with the valve and threads engaging said piston aperture.

In testimony whereof, I have hereunto signed my name.

MONTAGUE H. ROBERTS.